(No Model.)

J. COEFIELD.
ROAD CART.

No. 433,517. Patented Aug. 5, 1890.

Witnesses
A. B. Richmond
Chas. T. Richmond

Inventor
John Coefield

UNITED STATES PATENT OFFICE.

JOHN COEFIELD, OF FRANKLIN, PENNSYLVANIA.

ROAD-CART.

SPECIFICATION forming part of Letters Patent No. 433,517, dated August 5, 1890.

Application filed December 14, 1889. Serial No. 333,793. (No model.)

*To all whom it may concern:*

Be it known that I, JOHN COEFIELD, a citizen of the United States, residing at Franklin, in the county of Venango, State of Pennsylvania, have invented a new and useful Device for Attaching the Shafts to a Two-Wheeled Vehicle, of which the following is a specification.

My invention relates to improvements in the mode of attaching shafts to carts and other two-wheeled vehicles in such a manner as to prevent the oscillation of the box and seat, commonly called among horsemen "horse motion." I attain this object by means of the mechanism illustrated in the accompanying drawings, in which—

Figure 1:
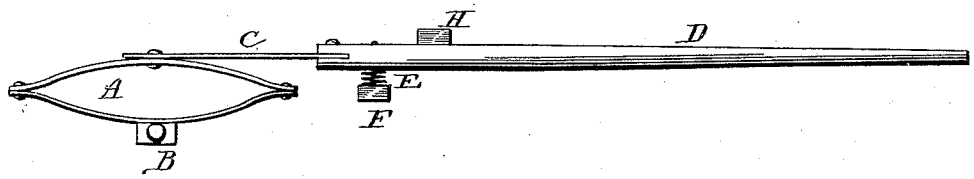
Figure 2:
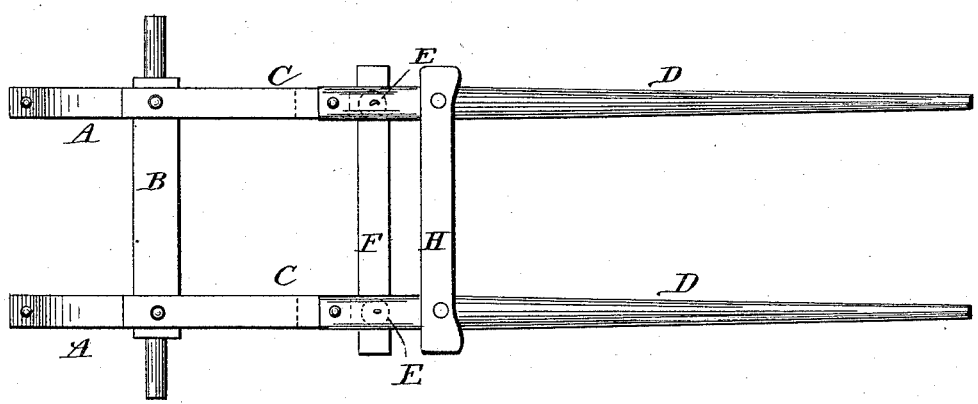

Figure 1 represents a side view of my device, and Fig. 2 a top view of the same.

A, Fig. 1, represents a spring bolted on the axle B.

C is a bar or spring of steel, one end of which is bolted on the spring A and the other on the shaft D.

H is the draw-bar bolted on the shafts.

F is a cross-bar attached to the shafts by a spiral spring E.

Fig. 2 shows the duplicate of Fig. 1, showing the two springs A A, the two shafts D D, two spiral springs E E, and two spring-steel bars C C.

The rear of the vehicle-body rests on the axle, with intermediate springs A A to take the jolting, while the front of said body, which supports the feet and some of the weight, rests upon the cross-bar F, which is connected with the under side of the shafts by the spiral springs E E. By this combination the longitudinal springs C C take up the horse motion at the rear of the vehicle-body, while the springs E E take it up at the front thereof.

What I claim, and desire to protect by Letters Patent, is—

The combination, in a two-wheeled vehicle, of the axle, elliptic springs thereon, flat longitudinal springs C C, and front support connected with the under part of shafts by the spiral springs E E, whereby the horse motion is taken up at the front and rear of the body by separate springs, as shown and described.

JOHN COEFIELD.

Witnesses:
CHAS. E. RICHMOND,
A. B. RICHMOND.